(12) United States Patent
Oberdorfer et al.

(10) Patent No.: US 10,926,894 B2
(45) Date of Patent: Feb. 23, 2021

(54) APPARATUS FOR BAGGING A PRODUCT

(71) Applicant: Robert Bosch GmbH, Stuttgart (DE)

(72) Inventors: Berend Oberdorfer, Pfullingen (DE);
Bernd Wilke, Leutenbach (DE);
Christoph Hammer, Marbach (DE);
Felix Kruppa, Fellbach (DE); Juergen Haak, Schondorf (DE)

(73) Assignee: SYNTEGON TECHNOLOGY GMBH, Waiblingen (DE)

( * ) Notice: Subject to any disclaimer, the term of this patent is extended or adjusted under 35 U.S.C. 154(b) by 18 days.

(21) Appl. No.: 16/092,163

(22) PCT Filed: Mar. 23, 2017

(86) PCT No.: PCT/EP2017/056922
§ 371 (c)(1),
(2) Date: Oct. 8, 2018

(87) PCT Pub. No.: WO2017/174367
PCT Pub. Date: Oct. 12, 2017

(65) Prior Publication Data
US 2019/0106227 A1    Apr. 11, 2019

(30) Foreign Application Priority Data

Apr. 6, 2016    (DE) .................... 10 2016 205 672.7

(51) Int. Cl.
*B65B 1/36*     (2006.01)
*G01F 13/00*    (2006.01)
*G01F 23/288*   (2006.01)

(52) U.S. Cl.
CPC .............. *B65B 1/36* (2013.01); *G01F 13/005* (2013.01); *G01F 13/006* (2013.01); *G01F 23/288* (2013.01)

(58) Field of Classification Search
CPC ....... B65B 1/36; G01F 13/005; G01F 13/006; G01F 23/288
See application file for complete search history.

(56) References Cited

U.S. PATENT DOCUMENTS

| 5,357,733 A | 10/1994 | Weikert |
| 2001/0020647 A1 | 9/2001 | Hansen |
| (Continued) | | |

FOREIGN PATENT DOCUMENTS

| DE | 19715579 A1 * | 11/1998 | ........... G01F 13/006 |
| DE | 19743057 | 4/1999 | |
| (Continued) | | | |

OTHER PUBLICATIONS

Translations of Specification of DE 10 2006 013663 (mailed to applicant Dec. 23, 2019) (Year: 2006).*

(Continued)

*Primary Examiner* — Craig M Schneider
*Assistant Examiner* — Jason K Niesz
(74) *Attorney, Agent, or Firm* — Michael Best & Friedrich LLP

(57) ABSTRACT

The invention relates to a device for filling a product, comprising—at least one metering device (18) for metering a specific amount of the product that is to be filled in the packaging material tube, —a sensor device (20) for detecting characteristic properties, in particular a mass and/or density and/or volume of the product, wherein the sensor device (20) is arranged such that it determines the characteristic properties of the product located in the metering device (18).

17 Claims, 3 Drawing Sheets

(56) References Cited

U.S. PATENT DOCUMENTS

| | | | |
|---|---|---|---|
| 2005/0173016 A1* | 8/2005 | Ludwig | B65B 3/36 |
| | | | 141/2 |
| 2013/0275061 A1* | 10/2013 | Fouad-Fahmi | G01F 1/86 |
| | | | 702/49 |
| 2014/0352266 A1 | 12/2014 | Seidel et al. | |
| 2014/0353507 A1* | 12/2014 | Glaser | G01F 23/292 |
| | | | 250/357.1 |

FOREIGN PATENT DOCUMENTS

| | | |
|---|---|---|
| DE | 10307672 | 9/2004 |
| DE | 102006013663 | 9/2007 |
| DE | 102007053860 | 5/2009 |
| DE | 102011077782 | 12/2012 |
| DE | 102011088880 | 6/2013 |
| DE | 102014107364 A1 | 11/2015 |
| EP | 2372321 A1 | 10/2011 |

OTHER PUBLICATIONS

Translations of Claims of DE 10 2006 013663 (mailed to applicant Dec. 23, 2019) (Year: 2006).*
Translations of Specification of DE 10 2011 077782 (mailed to applicant Dec. 23, 2019) (Year: 2011).*
Translations of Claims of DE 10 2011 077782 (mailed to applicant Dec. 23, 2019) (Year: 2011).*
Translation of DE-19715579, Ettenhofer Anton (Year: 1998).*
International Search Report for Application No. PCT/EP2017/056922 dated Jun. 14, 2017 (English Translation, 3 pages).

* cited by examiner

APPARATUS FOR BAGGING A PRODUCT

BACKGROUND OF THE INVENTION

The present invention relates to an apparatus for bagging a product.

Vertical tubular-bag machines are known from the state of the art in various configurations. In this connection, product elements of a product to be bagged are registered by means of a sensor device, in order to ascertain the quantity of product filled into the tubular bag. A tubular-bag machine of such a type is known from DE 10 2006 013 663 A1, for example. The sensor detects only objects outside the filling pipe. Although the spacing between the transmitter and the receiver of the quantity-measuring system is constant, the end of the tube in which the quantity to be detected is located may fluctuate in its positioning by a few millimeters or centimeters. By reason of these fluctuations, considerable faulty detections may occur. In addition, product-discharge devices are controlled. If a deviation arises between the set quantity and the currently measured quantity, the product-discharge device is readjusted, and thereby the quantity to be discharged is changed for the next bag to be filled.

EP 2 791 010 B1 relates to a tubular-bag machine for bagging a product, comprising a vertical filling pipe, a transverse-sealing unit, a control unit for controlling the tubular-bag machine, and a sensor device for registering the product in the filling pipe, said device being designed to register the product falling through the filling pipe, wherein the sensor device includes a sensor for emitting electromagnetic waves, which is connected to the control unit, wherein the electromagnetic waves emitted from the sensor remain in a registration space which is limited to a region on the filling pipe.

A method for dispensing a liquid or pourable medium into a container is known from DE 103 07 672 A1. The dispensing apparatus has a reservoir as well as a flow-measuring device and a valve. Control of the valve is effected as a function of the dispensed quantity registered by means of the flow-measuring device. An integrated flow-rate constitutes, at any instant, the quantity that has been dispensed into the container from the reservoir through the flow-measuring device and the valve. When a final value as ascertained by the flow-measuring device is attained, the valve is closed.

An apparatus and method for metering a pulverulent product are known from DE 10 2011 077 782 A1. The apparatus includes two sensors which are connected to a control unit which controls the drive mechanism. In this case, the density is determined several times during a filling operation, in order to ensure a metering that is as exact as possible.

SUMMARY OF THE INVENTION

The apparatus according to the invention, on the other hand, has the advantage that the density and/or the mass and therefore the quantity of the product to be bagged can be determined in the bagging apparatus itself. With this information, the product-discharge device can be regulated or controlled online—that is to say, during the metering process. This increases the accuracy of metering. Therefore a scrapping of incorrectly filled bags or packages in which the bagged quantity deviates significantly from the set quantity is avoided. In accordance with the invention, this is achieved by a particular arrangement of the sensor device, so that it ascertains the characteristic properties of the product located in the metering device, and also by the provision of a regulator which drives the metering device as a function of the output signal of the sensor device. With the aid of the knowledge of the metered quantity calculated or ascertained in each time-step since the start of metering, and of the set quantity, in each time-step the rotational speed, the revolutions and/or the metering-time, for instance, of the current metering operation is/are adapted via the regulator. Especially in the case of changes in the density of the product, these can be taken into consideration via the regulator virtually during the ongoing metering operation, so that the risk of faulty metering operations can be avoided.

In an expedient further development, a difference between a set-value progression and an actual progression, which depends on the output signal of the sensor unit, is supplied to the regulator. Therefore a continuous adaptation can be effected during the ongoing metering operation. Particularly expediently, a mass flow of the product is used as set-value progression and/or progression of the actual value. The mass flow preferably depends on the density of the product ascertained by the sensor unit. As a result, changes in density can be easily eliminated, so that the accuracy of the bagged product increases.

In an expedient further development, the set-value progression is chosen in such a way that for a certain metering-time the integral corresponds to the set value of the mass to be metered. Therefore, on the one hand, differing curve progressions can be predetermined, and, on the other hand, accurate metering is ensured.

In an expedient further development, the sensor device is designed to emit and/or receive electromagnetic waves. This technology, which is known as such, is especially suitable for the specific field of application, since it is distinguished by a simple and robust structural design.

In an expedient further development, the metering device is driven as a function of an output signal of the sensor device. Particularly expediently, the metering device is driven during the ongoing metering operation in the sense of a change of the set quantity. By virtue of the readjustment in ongoing metering operation, faulty filling is minimized.

In an expedient further development, the metering device and/or the metering pipe and/or the metering screw has/have been formed from a material that does not shield electromagnetic waves, preferentially synthetic material. Therefore a sensor unit that is based on electromagnetic waves may find application.

In an expedient further development, the sensor device is arranged on a metering pipe of the metering device, in particular on the outside. Therefore the sensor unit does not come into mechanical contact with the product to be bagged, reducing the susceptibility to interference.

In an expedient further development, at least one recess is provided in the metering pipe, in which the sensor device is at least partially arranged. Therefore the sensor device is protected but nevertheless arranged close to the product. As a result, a particularly compact structural form is obtained without impairing the performance and sensitivity of the sensor. Furthermore, the sensor can be exchanged in a straightforward manner without great installation effort. Particularly expediently, the sensor could have been completely integrated into the metering pipe. In this case, the sensor could have been arranged between the outside of the pipe and the inside of the pipe and could, where appropriate, have been completely encompassed.

In an expedient further development, the invention provides that the forming device, preferentially a forming shoulder and/or a forming pipe, at least partially surrounds the metering device. Therefore the sensor unit can be arranged between the forming device and the metering device in a manner protected against environmental influences.

In an expedient further development, the sensor unit is arranged in such a way that it is thereby able to register the degree of filling of the metering screw and therefore determine the volume of the product. Therefore the geometry of the sensor unit can be matched with regard to a known volume of the metering unit. This increases the accuracy of the ascertainment of the volume of the bagged product.

In an expedient further development, in addition to the signal of the sensor unit at least one further signal, preferentially a signal of the drive mechanism, is supplied to a controller for the purpose of ascertaining the characteristic variable of the product. The accuracy of the density and determination of the degree of filling can be further improved by combining the evaluation with the aid of a further variable. Therefore the regulation accuracy increases further. The inclusion of further measured variables makes the control process less susceptible to interference and therefore more stable.

BRIEF DESCRIPTION OF THE DRAWING

A preferred embodiment of the invention will be described in detail in the following with reference to the accompanying drawing. In the drawing.

DETAILED DESCRIPTION

An apparatus for bagging a product according to a preferred embodiment will be described in detail in the following with reference to FIG. 1.

Figure 1:
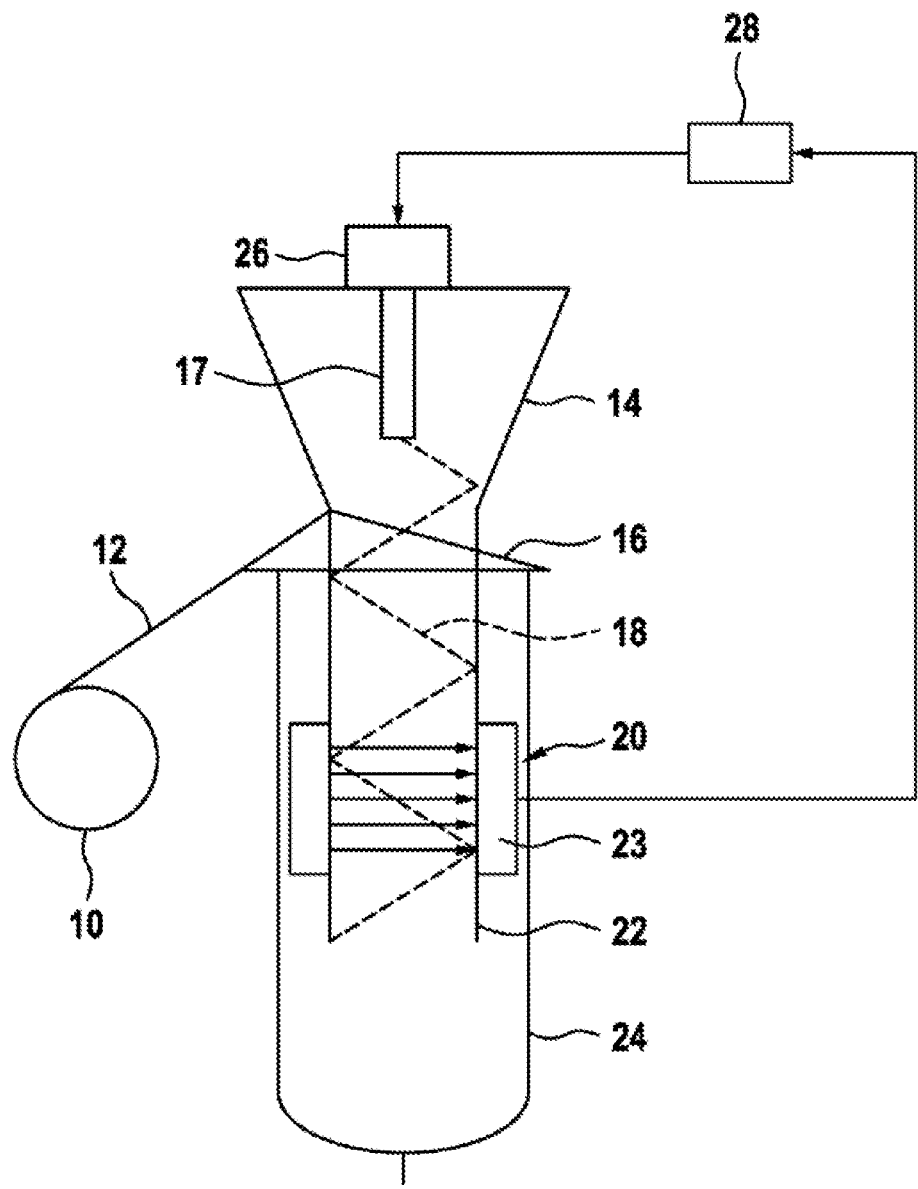
FIG. 1 is a schematic sectional representation of a tubular-bag machine according to a preferred embodiment of the invention

FIG. 1 shows a schematic sectional view of an apparatus 1 for bagging a product, according to a preferred embodiment of the invention. The apparatus 1 includes a hopper 14, into which a product to be bagged is supplied. A preferentially vertical metering pipe 22 is fastened to the hopper 14. The metering pipe 22 surrounds a metering screw 19 which supplies the product to be bagged in portions. The metering pipe 22 and the metering screw 19 form a metering device 18. Packaging material 12 has been rolled up on a packaging-material roll 10. The packaging material 12 is unrolled from the packaging-material roll 10 and supplied to a forming device 16, for instance a forming shoulder of a tubular-bag machine. Via the forming device 16, the supplied packaging material 12 is formed into a tube, and via a further forming device 24, for instance a forming pipe, formed into an elongated tube of packaging material which is heat-sealed by a longitudinal-sealing unit, not represented here, by virtue of a longitudinal-sealing seam in the longitudinal direction. The metering device 18 is surrounded by the forming device 24. The apparatus 1, for instance a tubular-bag machine, further includes a transverse-sealing unit, not represented expressly, with horizontal first and second sealing jaws, which may have been arranged at an end of the metering pipe 22 opposite the hopper 14. The transverse-sealing unit firstly seals a bottom seam on the formed and cyclically supplied tube of packaging material, and, after a portion of the product has fallen in and the filled tube section has been moved further down, the tube of packaging material is sealed by means of a top seam to form a closed bag, the bottom seam of the following packaging being sealed at the same time.

Furthermore, a sensor device 20 arranged in or on the metering device 18 is provided which registers characteristic properties, in particular a mass and/or a density and/or a volume of the product conveyed through the metering device 18. The sensor device 20 includes, for instance, a transmitter 21 and a receiver 23, which are each arranged outside the metering pipe 22. The transmitter 21 emits electromagnetic waves which are influenced or changed in a manner depending on the characteristic properties of the product, such as, for instance, the density, the volume, the weight or the quantity of the product. The receiver 23 arranged on the opposite side of the metering pipe 22 receives the electromagnetic waves. On the basis of the attenuation of the electromagnetic waves or of other characteristic variables, the influence of the characteristic properties of the product on the electromagnetic waves can be ascertained. The output signals of the sensor device 20 can be supplied to a controller 28. In this way, for a start an incorrectly filled metering device 18 and/or fluctuations of the characteristic properties caused by the product can be identified. By reason of the fact that the product is conveyed through the metering device 18 and the characteristic properties of said product are ascertained directly, the quantity of the product currently already discharged can be ascertained during a product-discharge operation.

The sensor unit 20 has a height h and determines therefrom the mass or the density. For instance, the density is ascertained. Since the volume of the section where the sensor unit 20 is seated and takes measurements is known, the quantity or the mass of product can be calculated. At any instant x during a metering, it is accordingly possible to determine the previous discharge of product and, where appropriate, to control or regulate the metering screw 19 in accordance with the set quantity. By virtue of the difference, ascertained online, between the already metered quantity and the set quantity, the metering device 18 can be regulated online. The metered quantity of product can be inferred via the ascertainment of the volume, the weight or the density of the product. With the aid of the geometry, the knowledge of the revolutions of the metering screw 19 since the measurement of the product, and the spacing between the sensor device 20 and the end of the metering screw 19—that is to say, at the point of discharge of the product—the temporally discharged quantity can be calculated. If, for reasons of space for instance, the sensor device 20 cannot be fitted in the metering pipe 22 but can rather be fitted ahead of or above the forming device 16 on the metering pipe 22, then a certain conveying distance lies between the sensor device 20—that is to say, the measuring-point—and the end of the metering pipe 22—that is to say, the point at which the product is discharged. Since several masses to be metered are located in the metering pipe 22, in one example the product is measured at time t but bagged only at time t+τ. Time τ can be calculated with the aid of known variables, such as the spacing of the measuring-point from the discharge of the product, the rotational speed and the metering-time in which the metering screw 19 revolves.

The accuracy of the density/mass and degree-of-filling determination/volume can be improved by a combination of the evaluation of various other variables. In the course of a metering, in parallel with the ascertainment of the density/ mass/volume other physical variables can also be registered, such as, for instance, the load-bearing capacity of the drive mechanism 26. By the combination of the values, the density/mass/volume can be determined more accurately in an evaluating logic unit (for instance, neural networks) or with the aid of an empirical characteristic map, and consequently the regulation accuracy can be distinctly increased. The inclusion of further measured variables makes the regulating process distinctly less susceptible to interference and more stable. For instance, the load-bearing capacity of the drive mechanism depends on, amongst other things, physical properties of the product. These dependencies may have been stored in an empirical characteristic map. Consequently, with the aid of further information, for example the load-bearing capacity of the drive mechanism 26, the physical variable, for example the density, can be ascertained at any instant on the basis of the characteristic map. This value can now, for example, be used for checking the plausibility of the sensor value of the sensor device 20.

The sensor device 20 may have been integrated into the metering pipe 22. Alternatively, the sensor device 20 may also have been fitted on the outside of the metering pipe 22. In this case, the sensor device 20 measures through the metering device 18. Depending upon the sensor device 20 being used, the material of the metering device 18 and/or of the metering pipe 22 has to be suitably chosen. The sensor device 20 could also take the form of a pipe sensor or tubular sensor. If said sensor is then pushed over the metering pipe 22, the metering pipe 22 must also have been produced from synthetic material. If the sensor device 20 is integrated into the existing metering pipe 22, the metering pipe 22 may then also consist of metal. At the points in the metering pipe 22 at which the sensor device 20—or, to be more exact, the transmitter 21 and the receiver 23—is/are placed, the material of the metering pipe 22 is removed and replaced by the sensor device 20. As a matter of principle, the sensor device 20 may be placed at a favorable point over the entire length of the metering device 18. In principle, the sensor device 20 could also be plate-shaped.

If the sensor device 20 is based on electromagnetic waves, a material that does not shield these waves, for instance a non-metallic material such as plastic, is suitable as material for the metering device 18 and/or for the metering pipe 22. By way of electromagnetic waves, waves in the terahertz range, X-ray waves or microwaves or radio waves come into operation, for instance.

In addition, a drive mechanism 26 is provided which moves the metering device 18 in the course of the metering operation. For this purpose, the drive mechanism 26 could act on a rotatably mounted holder 17 to which, for instance, the metering screw 19 of the metering device 18 is fastened. The drive mechanism 26 can be driven by the controller 28. The controller 28 may optionally receive characteristic information from the drive mechanism 26, for instance about the loading, rotational speed, position, etc. With this information, the controller 28 can further improve or check the plausibility of the signals of the sensor device 20 for the purpose of ascertaining the physical variables of the metered product. If, for example, in the case of a product to be metered the loading of the metering device 18 falls, even in the case of constant parameters the physical values of the sensor unit 20 must change—that is to say, the density/mass becomes lower. The loading and the physical values are dependent on one another—that is to say, they correlate. With the aid of such further information it is possible to check the plausibility of the signals of the sensor unit 20.

The controller 28 drives the metering device 18 in such a way that a desired set quantity of the product to be metered is filled into the available packaging such as, for instance, a tube of packaging material. In a manner depending on the characteristic variable of the product ascertained from the output signal of the sensor unit 20, the controller 28 determines whether the actual quantity ascertained in this way deviates from the set quantity of the product to be bagged. If this is the case, the controller 28 changes the correcting variables for the metering device 18. This can be effected, for instance, in a change of the activating variables for the drive mechanism 26. This change could be effected in the form of a regulation, for instance via simple standard regulators such as P, PI, PID controllers or other (robust) regulators or regulating methods.

By way of metering device 18, a metering screw 19, for instance, comes into operation. The product to be metered is supplied in the desired quantity to the packaging to be filled via appropriate threads, as described above. The sensor device 20 is arranged adjacent to the metering device 18 for the purpose of ascertaining characteristic variables of the product to be metered. In addition, the metering device 18 is controlled or regulated as a function of an output signal of the sensor device 20. The metering device 18 can be used, amongst other things, for filling bags of a vertical tubular-bag machine, but it can also be employed in horizontal tubular-bag machines. However, the filling of bags employed in a chain is also possible by virtue of the metering device 18. Alternatively, prefabricated bags could also be filled, and the bagged quantity could be ascertained by the sensor unit 20. The forming device 16, 24 does not necessarily have to be an integral part of the apparatus. Moreover, it is also essential that the sensor device 20 ascertains the physical variables of the product to be bagged during the metering operation, so that an appropriate influencing of the ongoing metering operation becomes possible. Consequently the metering device 18 can be regulated to the set quantity or the set weight during the metering operation. The product is, for instance, a free-flowing or flowable product.

Figure 2:
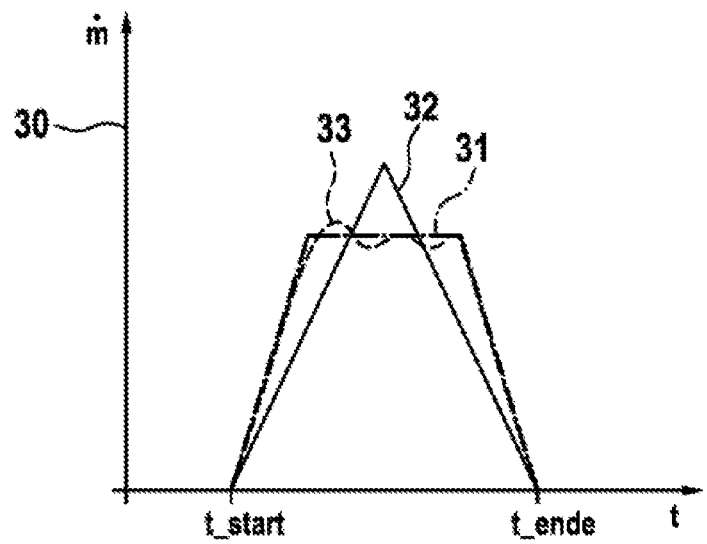
FIG. 2 is the time-dependent progression of the mass flow in the form of two set-value progressions as well as the actual value.

Differing temporal progressions of a mass flow 30 are shown in FIG. 2. A first set-value progression 31 of a mass flow 30 exhibits, for instance, a trapezoidal progression. At a start-time t_start, the set-value progression 31 rises with a certain flank and subsequently attains a constant mass flow 30 which is maintained for a certain time-interval before the set-value progression 31 drops off again with a certain flank to the value zero at time t_ende. A further (alternative) set-value progression 32 of a mass flow 30 exhibits, for instance, a triangular progression. The further set-value progression 32 rises linearly up to a maximum peak value of the mass flow 30 and thereupon goes back again linearly to the value zero at time t_ende. Sketched by way of example is the progression of the actual value 33 of the mass flow 30 as ascertained on the basis of the output signal of the sensor unit 20 and as arises, for instance, in the case of the first set-value progression 31 shown in FIG. 2. The set-value progressions 31, 32 are predetermined in such a way that the integral of the respective set-value progression 31, 32 over the metering-time T (t_ende−t_start) predetermines the set quantity m_soll. A further possibility would be to alter the metering-time T, the revolutions of the screw, the rotational speed. This could be done on the basis of calculations. The bagged quantity m_ist is determined according to FIG. 2 with the aid of the area of the curve lying below the actual value 33 or, to be more exact, as the integration of the actual value 33. Accordingly, the actual value 33 will fluctuate and will initially not coincide 100% with the set value 31. The regulator 36 amplifies the difference between the set value 31 and the actual value 33. Depending upon the amplification factor of the regulator 36, the actual value 33 attains the set value 31 more quickly or more slowly. It is essential, however, that the areas under the curves of the set value 31 and of the actual value 33 match one another. If the areas below the two curves are identical, the metered mass or the metered weight are also identical.

Figure 3:
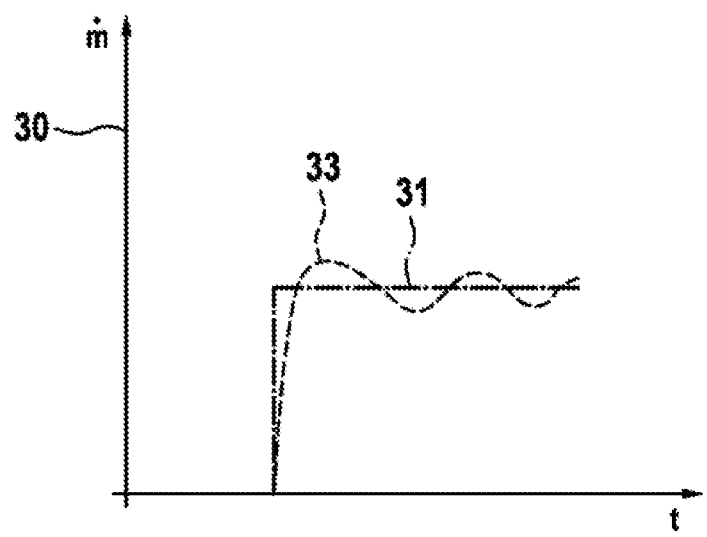
FIG. 3 is an exemplary progression of a jump by way of default and the associated behavior of the regulator.
Figure 4:
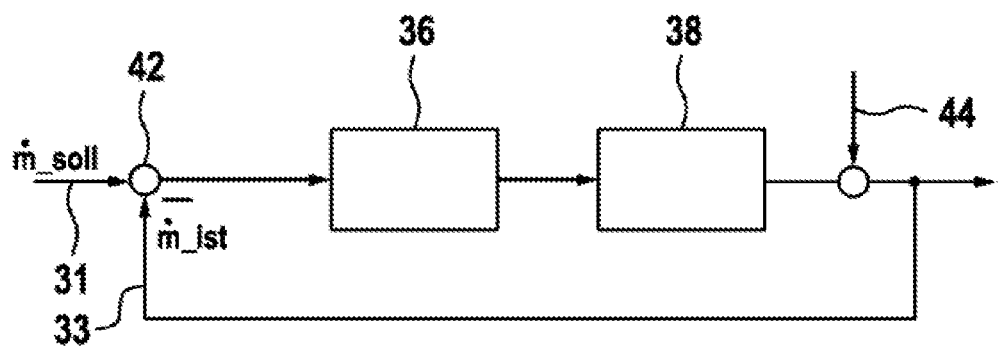
FIG. 4 is a block diagram of a regulator structure.

In FIG. 3 the temporal progression of the jump response of a regulator 36 shown in FIG. 4 is illustrated on the basis of the set-value progression 31 of the mass flow 30 and the temporal progression of the associated actual value 33 of the mass flow 30.

In FIG. 4 the regulator structure that might have been realized in the controller 28 is shown in greater detail as a block diagram. A set value 31 of the mass flow 30 is supplied to a summation point 42. The control difference formed from the set value 31 and the actual value 33, likewise supplied to the summation point 42, arrives at a regulator 36. The output signal of the regulator 36 is passed to a controlled system 38. By way of perturbation variable, mass-flow fluctuations 44 or density fluctuations in respect of the output signal of the controlled system 38 get into the control loop. The output signal resulting therefrom is fed back to the summation point 42 by way of actual value 33, as already described. The controlled system 38 reproduces the behavior of the metering. By way of regulator 36, a PI controller, for instance, comes into operation. However, other suitable regulators may also find application.

The sensor unit 20 continuously measures a measure of the mass or of the characteristic property of the product to be bagged. In the embodiment, this is the density 46. Alternatively, the sensor unit 20 could also determine the mass of the metered product directly, where appropriate taking into consideration the moisture content of the metered product. The value of the density 46 ascertained in each scanning-step of the sensor unit 20, or a value derived therefrom as will be described in greater detail below, is fed back to the controller 28 or to the underlying regulator unit according to FIG. 4. The regulator 36 in the control unit 28 preferentially regulates the mass flow 30 to the desired set-value progression 31, 32. The set-value progression 31, 32 is defined in such a way that the integral of the set-value progression 31, 32 over the metering-time accurately pre-determines the set quantity.

From the knowledge of the quantity already discharged at each instant in the course of each metering, it can be ascertained how the metering device 18 is regulated to the set quantity 31, 32 via the regulator 36. With the aid of changes in the density (perturbation variable 44), it is possible to regulate the mass flow 30 via the volume flow. In this case, the volume flow is regulated via the continuous adaptation of the rotational speed of the drive mechanism 26, for instance of the metering screw 19. The perturbation of the metering screw 19—that is to say, for instance, the changes in density of the moving metering device 18—can be eliminated, in order that only pure product densities are measured. The current actual value 33 of the mass flow 30 can, for instance, be ascertained via the equation:

Mass flow 30=Density 46*Volume flow=Density 46*$ds/dt$*Area $A$ where $ds/dt$ is temporal change in height—that is to say, the speed at which the product is conveyed by means of the metering device 18, which is predetermined by the speed of the drive mechanism 46. Via the speed multiplied by the screw pitch (in the case of the metering screw 19 as possible metering device 18), the speed results at which the mass is transported. If this is multiplied by the area A (for instance, an area of a circle), the volume flow is obtained. The area A is, for instance, the cross-sectional area of the metering pipe 22 of the metering device 18. If the volume flow is multiplied by the density 46, the mass flow 30 is obtained.

The sensor 20 ascertains the density 46 in the metering device 18. Particularly in the case of a metering screw 19, a homogeneous density distribution of the product may be assumed. In principle, the arrangement of the sensor unit 20 does not matter; in the case of a homogeneous distribution of the product, the currently discharged quantity at the respective instant can be calculated from the knowledge of the spacing of the sensor unit 20 from the point of discharge, from the rotational speed of the metering device 18, such as a metering screw for instance, and from screw pitch. Between the instant of the density measurement and the point of discharge, the time-delay is ascertained and taken into consideration in the regulator structure.

Via a user interface, the rotational speed of the metering device 18, the quantity to be metered, the maximum revolutions and the metering-time T used for this purpose can, for instance, be entered. From the data, the default for the corresponding set-value progression 31, 32 is determined by means of a calculation formula (for instance, a trapezoidal formula or triangular formula as shown in FIG. 2). This takes place in the course of each individual metering. If a value, for instance the metering-time T between two metering operations, is altered, at the time of the next metering operation the set-value progression 31, 32 is changed. Therefore a planning and change of the set-value progression 31, 32 is possible also during the metering (online). In the case of the calculation formula by means of a trapezoid, the surface area determines the metered mass, the width determines the metering-time T, and the height determines the mass flow 30 and therefore the revolutions of the screw of the metering device 18.

Via the regulator structure shown according to FIG. 4, regulation to the predetermined set-value progression 31, 32 of the mass flow 30 is effected for a metering operation for the metering-time T, in the course of which during the metering operation the actual value 33 of the mass flow 30 is continually ascertained via the output signal of the sensor unit 20 and made available to the control loop. The metered mass m_ist can be determined with the aid of the integral of the actual value 33 of the mass flow 30 during the metering-time T. With the aid of the knowledge of the already discharged metered quantity calculated or ascertained in each time-step since the start of metering, and of the set quantity, at each instant the rotational speed, the revolutions and/or the metering-time of the current metering is/are adapted for the drive mechanism 26 via the regulator 36. As described, the set-value progression 31, 32 of the mass flow 30 is preferentially ascertained for each metering operation. Only one rotational speed can be predetermined for the metering device 18. Consequently the set-value progression 31, 32 which the regulator 36 outputs is transformed or converted into the set rotational speed or set rotational-speed progression. In this case a constant density 46 is assumed.

For example, the mass flow 30 of the product to be metered is predetermined via the metering-time T. But if the density 46 (perturbation variable 44) changes during a metering, the volume flow and therefore the rotational speed are influenced. This can be undertaken, for instance, with the aid of a PI controller or PID controller or a status feedback, or some other regulator. By way of regulator 36, use may be made of P, PI, PID, cascade, fuzzy or adaptive regulators, MPC (model predictive control), flatness-based regulating methods or further regulating methods such as robust regulators, optimal regulators or the like.

What is claimed is:

1. An apparatus for filling packaging with a product, the apparatus comprising
    at least one metering device (18) for metering a certain quantity of the product into a packaging tube or bag,
    a sensor device (20) for registering a density of the product, wherein the sensor device (20) is arranged in such a way that the sensor device ascertains the density of the product located in the metering device (18), and
    a controller (28) configured to control at least one regulator (36) that drives the metering device (18) as a function of an output signal of the sensor device (20),
    wherein, to control the at least one regulator, the controller (28) is configured to continuously determine a difference formed between a set-value progression (31, 32) of a mass flow of the product and an actual progression (33) of the mass flow of the product, based on the output signal of the sensor device (20) during an ongoing metering operation,
    wherein the controller (28) is configured to use the difference to control the at least one regulator (36) to continuously adjust a speed of the metering device (18), and
    wherein a substantial portion of the set-value progression (31, 32) has a non-zero slope when plotted over a time period.

2. The apparatus as claimed in claim 1, characterized in that a metered mass is ascertained as a function of the output signal of the sensor unit (20).

3. The apparatus as claimed in claim 1, characterized in that the set-value progression (31, 32) is chosen in such a way that for the duration of a metering-time (T) the integral corresponds to the set value of the mass to be metered.

4. The apparatus as claimed in claim 1, characterized in that the controller (28) ascertains the actual progression (33) of the mass flow as a function of the output signal of the sensor unit (20) and as a function of the speed (ds/dt) of the metering device (18) and as a function of an area (A) of the metering device (18).

5. The apparatus as claimed in claim 1, characterized in that the metering device (18) and/or a metering pipe (22) and/or a metering screw (19) is/are formed from a material that does not shield electromagnetic waves.

6. The apparatus as claimed in claim 1, characterized in that a metered quantity is determined by using the mass flow of the product and also in a manner depending on a filling-time and/or the speed of the metering device (18) and/or on a geometrical arrangement of the sensor unit (20) or on a spacing from the discharge of the product.

7. The apparatus as claimed in claim 1, characterized in that at least one further signal is supplied to the controller (28) for the purpose of ascertaining the mass flow of the product.

8. The apparatus as claimed in claim 1, characterized in that a controller (28) for driving a drive mechanism (26) is provided, said controller (28) including the regulator (36).

9. The apparatus as claimed in claim 1, characterized in that a metered mass is ascertained as a function of the output signal of the sensor unit (20) using a density (46) of the product to be metered as output signal of the sensor device (20).

10. The apparatus as claimed in claim 1, characterized in that the set-value progression (31, 32) is chosen in such a way that for the duration of a metering-time (T) the integral corresponds to the set value of the mass to be metered.

11. The apparatus as claimed in claim 1, characterized in that the set-value progression (31, 32) is formed as a function of the quantity to be metered and/or as a function of a metering-time (T) and/or as a function of the speed of the metering device (18).

12. The apparatus as claimed in claim 1, characterized in that the metering device (18) and/or a metering pipe (22) and/or a metering screw (19) is/are formed from a synthetic material that does not shield electromagnetic waves.

13. The apparatus as claimed in claim 1, characterized in that a signal of a drive mechanism (26) of the metering device (18) is supplied to the controller (28) for the purpose of ascertaining the mass flow of the product.

14. The apparatus as claimed in claim 1, characterized in that the substantial portion of the set-value progression (31, 32) is at least ⅓ of the set-value progression (31, 32).

15. The apparatus as claimed in claim 1, characterized in that the substantial portion of the set-value progression (31, 32) is at least ½ of the set-value progression (31, 32).

16. The apparatus as claimed in claim 1, characterized in that the set-value progression (31, 32) is formed as a function of the quantity to be metered and/or as a function of a metering-time (T) and/or as a function of the speed of the metering device (18).

17. The apparatus as claimed in claim 16, characterized in that the set-value progression (31, 32), including the substantial portion of the set-value progression (31, 32) having a non-zero slope, exhibits a trapezoidal or triangular progression when plotted over a time period.

* * * * *